United States Patent [19]
Rifkin

[11] 4,065,918
[45] Jan. 3, 1978

[54] EXHAUST SYSTEMS
[75] Inventor: Ellis B. Rifkin, Southfield, Mich.
[73] Assignee: Ethyl Corporation, Richmond, Va.
[21] Appl. No.: 331,680
[22] Filed: Feb. 12, 1973
[51] Int. Cl.² .............................................. F01N 3/15
[52] U.S. Cl. ................................. 60/274; 23/288 FC; 60/299; 423/213.5
[58] Field of Search ...................... 60/274, 297, 299; 55/444–446, 461–465; 181/36 C, 56, 63, 69; 23/288 F, 288 FC; 423/213.3, 213.5, 213.7

[56] References Cited
U.S. PATENT DOCUMENTS

| | | | |
|---|---|---|---|
| 1,186,067 | 6/1916 | Becker | 181/69 |
| 1,264,853 | 4/1918 | Phyfe | 181/69 |
| 1,716,481 | 6/1929 | Bilsky | 60/297 |
| 3,180,712 | 4/1965 | Hamblin | 60/299 |
| 3,224,171 | 12/1965 | Bowman | 181/36 C |
| 3,273,666 | 9/1966 | Hamilton | 181/56 |
| 3,441,381 | 4/1969 | Keith | 60/299 |
| 3,556,735 | 1/1971 | Epelman | 23/288 F |
| 3,749,130 | 7/1973 | Howitt et al. | 23/288 FC |
| 3,773,894 | 11/1973 | Bernstein | 60/301 |

FOREIGN PATENT DOCUMENTS

| | | | |
|---|---|---|---|
| 39,888 | 6/1965 | Germany | 181/69 |

Primary Examiner—Douglas Hart
Attorney, Agent, or Firm—Donald L. Johnson; Robert A. Linn; Joseph D. Odenweller

[57] ABSTRACT

The useful life of a catalyst being used in an engine exhaust system to lower the undesirable constituents in the exhaust gas of an engine being operated on gasoline containing a cyclopentadienyl manganese antiknock is greatly prolonged by providing an exhaust system having a plurality of baffles in the exhaust flow path upstream from the catalyst forming a tortuous flow path.

16 Claims, 6 Drawing Figures

EXHAUST SYSTEMS

BACKGROUND

Cyclopentadienyl manganese compounds are excellent antiknocks in gasoline used to operate spark ignited internal combustion engines. Use of such compounds as antiknocks is described in U.S. Pat. Nos. 2,818,417; 2,839,552 and 3,127,351, incorporated herein by reference. Not only are these compounds effective antiknock agents, but it has also been found that they do not adversely affect the activity of catalysts used to decrease the amount of undesirable constituents in engine exhaust gas. Under some operating conditions it has been found that, although the manganese antiknocks do not lessen the activity of the exhaust gas catalyst, they can interact in some manner at the surface of the catalyst bed leading to a reduction in the size of the openings into the bed thereby causing an increase in exhaust back pressure. The present invention provides a simple effective means of alleviating this problem.

SUMMARY

According to the present invention, the useful life an an exhaust gas catalyst being used in an exhaust system of an engine operating on gasoline containing a cyclopentadienyl manganese antiknock is greatly increased by providing a plurality of baffles in the exhaust flow path upstream from the catalyst arranged such that the baffles form a tortuous flow path through which the exhaust gas flows prior to contacting the catalyst.

DESCRIPTION OF THE PREFERRED EMBODIMENTS

A preferred embodiment of the invention is an exhaust system for a spark ignited internal combustion engine comprising a catalytic exhaust reactor connected to the exhaust outlet of the engine and including a plurality of baffles in the exhaust flow path between the catalyst bed and the engine. The baffles are arranged transverse to the direction of exhaust flow and from a tortuous flow path.

Figure 1:
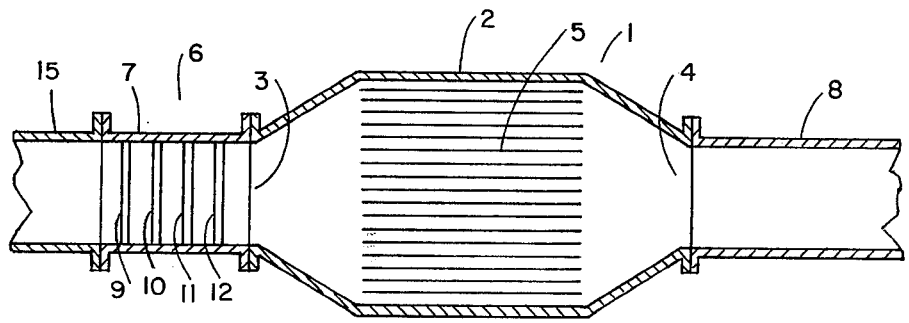
FIG. 1 is a longitudinal cross-section of a catalytic exhaust reactor having a baffle unit connected to its inlet.
Figure 2:
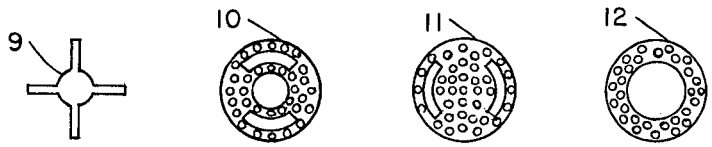
FIG. 2 is a plan view of each of the baffle disks taken from the baffle unit of FIG. 1.
Figure 3:
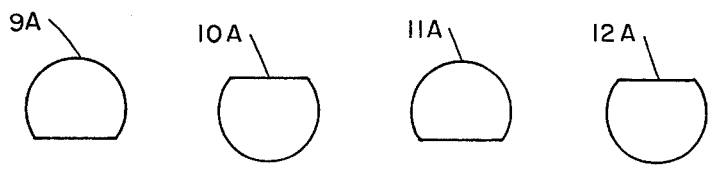
FIG. 3 is a plan view of an optional set of baffle disks suitable for use in the baffle unit of FIG. 1.

The essential elements of such a system are shown in FIG. 1. Catalytic reactor 1 is formed by enlarged cylindrical-frustoconical housing 2 having inlet 3 and outlet 4. Located within housing 2 is catalyst bed 5 which, in this embodiment, is a honeycomb alumina-magnesia-silica monolithic ceramic supported platinum catalyst as described in U.S. Pat. No. 3,441,381, incorporated fully herein by reference.

Connected to inlet 3 is baffle unit 6 comprising tubular housing 7 containing baffle disks 9, 10, 11 and 12. These disks can be welded to the inside of housing 7 or held in place by any equivalent means. They are preferably but not necessarily spaced about ¼–2 inches apart, and more preferably about ¼–½ inch apart. Each baffle disk can be seen to have openings of various shapes which when installed in housing 7 are not in substantial alignment with the openings in an adjacent disk and thus form a tortuous flow path through housing 7. In other words, when the exhaust gas passes through an opening in the first element it encounters a surface on the second element, causing it to abruptly change directions and flow to openings in the second element. After passing through openings in the second element, it again encounters a surface of the third element, again causing it to change directions to seek the openings in the third element, etc. As shown, disks 9, 10, 11 and 12 also contain small perforations in their "non-opening" surface, which has been found to give good results.

Figure 4:
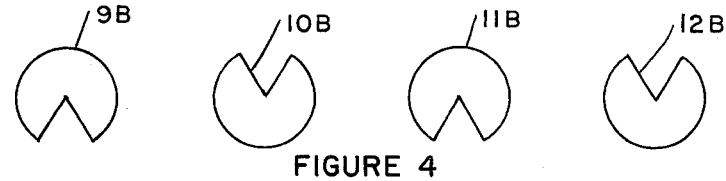
FIG. 4 is a plan view of another optional set of baffle disks suitable for use in the baffle unit of FIG. 1.

Disk baffles 9A, 10A, 11A and 12A of FIG. 3, or 9B, 10B, 11B and 12B of FIG. 4, can optionally be substituted for disks 9, 10, 11 and 12.

Baffle unit 6 is connected by pipe 15 to the exhaust outlet of an internal combustion engine (not shown) and is adapted to conduct hot exhaust gas from the engine to baffle unit 6 from which it proceeds directly into catalytic reactor 1.

In order to obtain rapid warm-up required for catalyst activation, the catalytic reactor is preferably located proximate to the engine exhaust outlet. In some embodiments catalytic reactor 1 is connected through baffle unit 6 directly to the engine exhaust manifold outlet. In fact, baffle unit 6 can be constructed as part of the internal structure of the exhaust manifold thereby permitting direct connection of catalytic reactor 1 to the manifold outlet.

As mentioned above, the catalytic reactor is preferably, but not necessarily, proximate to the engine. By "proximate" is meant that it is close enough such that the catalyst bed is rapidly heated to "light-off" or activation temperature. The exhaust gas temperature required to accomplish this is dependent upon the nature of the catalyst. Noble metal catalysts or those containing at least some noble metal light-off at much lower exhaust temperatures, e.g., 350°–500° F. However, in order to insure early light-off, the catalytic reactor is preferably located such that the inlet exhaust temperature is above about 1000° F., and more preferably above about 1400° F., during normal engine cruise conditions. It is also under these conditions that the cyclopentadienyl manganese antiknocks are most likely to plug the catalyst and, hence, it is under these preferred conditions that the present invention is most useful.

The exhaust system of this invention is useful in both chemical oxidation and reduction applications of catalytic exhaust reactors. When reduction of nitrogen oxides is desired the engine is operated slightly rich (e.g., below 14/1 air/fuel ratio) without employing air injection. When oxidation of hydrocarbons and carbon monoxide is desired the oxygen content of the exhaust gas is increased by either operating lean (e.g., above 15/1 air/fuel ratio) or by injecting air into the exhaust gas, or both. The present invention is most useful when used in exhaust gas oxidation applications, although it is by no means limited to this.

As stated above, the embodiment being discussed uses a honeycomb monolithic ceramic supported platinum catalyst as described in U.S. Pat. No. 3,441,381. These are made by coating a corrugated ceramic structure such as described in U.S. Pat. No. 3,444,925 with an activated alumina (e.g., gamma-alumina) and a platinum compound. The preferred ceramics are made according to U.S. Pat. No. 3,444,925 using alumina-silica (e.g., mullite, $3Al_2O_3.2SiO_2$), magnesia-alumina-silica (e.g., cordierite, $2MgO.2Al_2O_3.5SiO_2$), or mixtures thereof. Palladium can be used in place of platinum, and since these elements generally occur in nature together, it is sometimes preferred to use mixtures of platinum and palladium.

The invention is not limited to honeycomb monolithic ceramic supported platinum or palladium catalysts. Examples of other catalytic metals include V, Cr, Mn, Fe, Co, Ni, Cu, Zn, Zr, Nb, Mo, Ru, Rh, Ag, W, Re, Os, Ir, Pb, Ba, and the like. These are generally used in an oxide form. They may be used individually or in various combinations such as Cu-Cr, Cu-Cr-V, Cu-Pd, Mn-Pd, Ni-Cr, and the like. They may be supported on the above monolithic ceramic support or on any other of numerous well-known catalyst supports such as granular, pelletized or extruded alumina, silica, silica-alumina, zirconia, magnesia, alumina-magnesia, and the like. Such catalysts are disclosed in U.S. Pat. Nos. 3,540,838; 3,524,721; 3,447,893; 3,433,581; 3,428,573; 3,425,792; 3,374,183; 3,271,324; 3,224,981; 3,224,831 and 3,207,704.

In operation, exhaust gas from the engine is conducted by pipe 15 to baffle unit 6. On passing through housing 7 the exhaust gas encounters baffle disks 9, 10, 11 and 12. Openings in these disks are arranged such that the exhaust gas after passing through the openings in one disk is forced to abruptly change direction prior to passing through an opening in a subsequent disk—in other words, the openings in the disks are arranged to form a tortuous path through the baffle unit.

Other disks such as 9A–12A or 9B–12B can be used in baffle unit 6 to form the tortuous path. The invention is not limited to the precise shape of the disks as long as they are arranged to form the required tortuous path.

After passing through baffle unit 6, the exhaust gas enters catalytic reactor 1 at inlet 3 and then enters catalyst bed 5. After traversing catalyst bed 5 wherein the amount of undesirable constituents are lowered, the exhaust gas leaves catalyst reactor 1 at outlet 4 and is conducted by exhaust pipe 8 to a suitable exhaust location.

Figure 5:
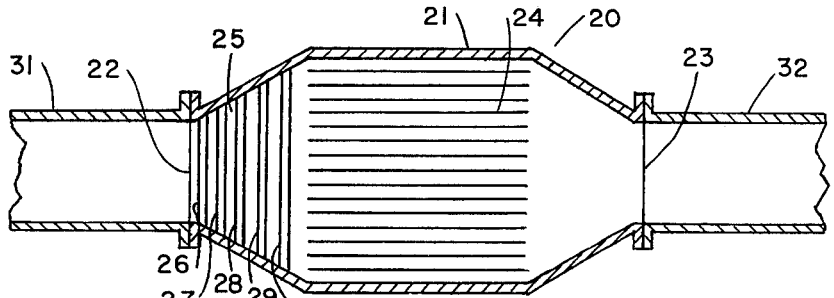
FIG. 5 is a longitudinal cross-section of a catalytic exhaust reactor having baffle disks located in its inlet plenum.
Figure 6:
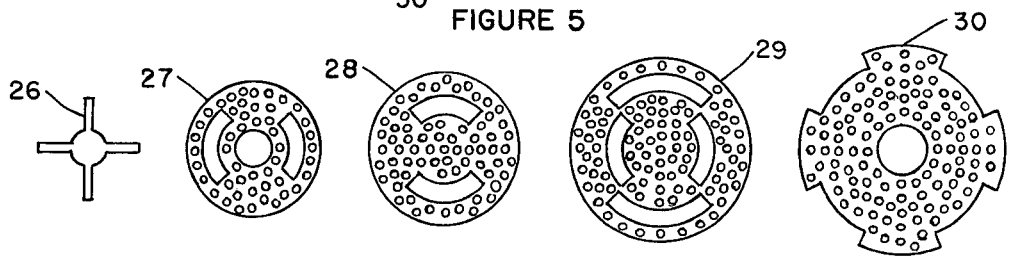
FIG. 6 is a plan view of the baffle disks taken from the inlet plenum of FIG. 5.

In the embodiment of FIG. 5 the baffle disks are located within the catalytic reactor. Catalytic reactor 20 is formed by reactor housing 21 having inlet 22 and outlet 23. Located within housing 21 is catalyst bed 24 forming frustoconical inlet plenum 25 between catalyst bed 24 and inlet 22. Baffle disks 26, 27, 28, 29 and 30 are positioned in plenum 25 transverse to its longitudinal axis and are attached to the inside of housing 21 by any suitable means such as welding. Baffle disks 27–30 have a multitude of small perforations. Disks 26–30 have openings arranged such that the openings in one disk are for the most part not axially in line with the openings in the subsequent disk. Inlet 22 is connected by pipe 31 to the exhaust outlet of the engine (not shown) and outlet 23 connects through pipe 32 to a suitable exhaust area.

In operation, hot exhaust gas from the engine passes through pipe 31 to inlet 22 and enters inlet plenum 25 where it encounters baffle disks 26–30. The great majority of the exhaust gas passes through the large openings in the baffle disks and is thus forced to follow a tortuous path prior to reaching catalyst bed 24. The exhaust gas then passes through catalyst bed 24 and leaves catalytic reactor 20 at outlet 23 from where it is conducted by pipe 32 to an exhaust area.

As stated previously, it is generally desirable to have the catalytic reactor close to the engine to insure early light-off. In one embodiment inlet 22 of catalytic reactor 20 is connected directly to the outlet of the engine exhaust manifold.

It is not clear exactly how the invention functions to reduce catalyst plugging by cyclopentadienyl manganese antiknocks, but tests have been conducted which show that it is highly effective in accomplishing this objective. These tests were made using a single cylinder 36 CID engine operating on gasoline containing one gram of manganese per gallon as methylcyclopentadienyl manganese tricarbonyl. Air/fuel ratio was adjusted to approximately 16/1 to obtain 1.8 percent oxygen in the exhaust. The engine was continuously operated at wide open throttle and the exhaust gas conducted to a catalytic reactor of the type shown in FIG. 1 containing a honeycomb monolithic ceramic supported platinum catalyst (Engelhard Industries, Inc., PTX-313). The exhaust temperature at the catalyst inlet was about 1500° F. in all tests. Exhaust back pressure was measured to determine degree of catalyst plugging. Initial back pressure was about 0.3 psig. An increase to 2 psig was considered a plugged catalyst bed. Results obtained compared to a no baffle control are shown in the following table.

| | Hours to Plugging |
|---|---|
| control | 45 |
| 3 baffles in inlet plenum[1] | 174 |
| 3 baffles ahead of inlet[2] | 360 |

[1]Similar to Figure 5
[2]As in Figure 1

As the results show, the present invention is highly effective in alleviating the catalyst plugging problem associated with use of exhaust gas catalysts in engines operating on fuel containing a manganese antiknock.

I claim:

1. A catalytic reactor resistant to plugging when used in the exhaust system of an internal combustion engine operating on gasoline containing a cyclopentadienyl manganese antiknock compound, said catalytic reactor comprising a reactor housing having an inlet and an outlet and containing a catalyst bed between said inlet and said outlet such that said exhaust gas passes through said catalyst bed in passing from said inlet to said outlet, said inlet having a cross-sectional area substantially less than the area of the entry face of said catalyst, said housing having an expansion zone between said inlet and said entry face, said reactor including a conduit section connected to said inlet extending away from said expansion zone, said conduit section containing a plurality of transverse baffles, each of said baffles having at least one large opening through which exhaust gas can pass, said openings being arranged such that the openings in one baffle are not substantially in axial alignment with the openings in an adjacent baffle, the space between each baffle being empty, said baffles forming an unimpeded tortuous flow path through said conduit section, said baffles functioning to inhibit the plugging of said catalyst bed by manganese compounds in said exhaust gas.

2. A catalytic reactor of claim 1 wherein said baffles have a plurality of small perforations.

3. A catalyst reactor of claim 1 wherein said catalyst bed comprises a catalytic metal supported on a honeycomb monolithic ceramic support.

4. A catalytic reactor of claim 3 wherein said support is selected from the group consisting of alumina-silica, alumina-magnesia-silica, and mixtures thereof.

5. A catalytic reactor of claim 4 wherein said support is selected from the group consisting of mullite, cordierite, and mixtures thereof.

6. A catalytic reactor of claim 4 wherein said catalyst metal is selected from the group consisting of platinum, palladium, and mixtures thereof.

7. In an exhaust system for an internal combustion engine, said exhaust system including a catalytic reactor at a location where inlet exhaust temperature exceeds about 1000° F. during normal engine cruise conditions, said catalytic reactor being defined by a reactor housing having an inlet and an outlet and having a catalyst bed disposed between said inlet and said outlet, the space between said inlet and the entry face of said catalyst forming an expansion zone wherein the exhaust flow cross-section expands from the cross-sectional area of said inlet to the surface area of said entry face, said inlet being operatively connected by exhaust conduit means to the exhaust outlet of said engine, said catalyst comprising a catalytic metal supported on a honeycomb monolithic ceramic support which is prone to plugging when said engine is operated on gasoline containing a cyclopentadienyl manganese antiknock, the improvement comprising a plurality of transverse baffles located in said exhaust conduit means upstream from and proximate to said inlet, each of said baffles having at least one large opening through which exhaust gas can pass, said openings being arranged such that the openings in one baffle are not substantially in axial alignment with the openings in an adjacent baffle, the space between said baffles being empty, said baffles forming an unimpeded tortuous flow path and functioning to inhibit the plugging of said catalyst by manganese compounds in said exhaust gas.

8. An exhaust system of claim 7 wherein said exhaust after transversing said tortuous path passes directly into said catalyst bed.

9. An exhaust system of claim 7 wherein said support is selected from the group consisting of alumina-silica, alumina-magnesia-silica, and mixtures thereof.

10. An exhaust system of claim 9 wherein said support is selected from the group consisting of mullite, cordierite, and mixtures thereof.

11. An exhaust system of claim 9 wherein said catalytic metal is selected from the group consisting of platinum, palladium, and mixtures thereof.

12. An exhaust system of claim 7 wherein said baffles have a plurality of small perforations.

13. A method of preventing the early plugging of an exhaust gas catalyst being used in an exhaust system of an internal combustion engine at a location where the temperature of the exhaust gas initially contacting said catalyst exceeds about 1000° F. during normal engine cruise conditions, said catalyst being used to lower the amount of undesirable constituents in the exhaust gas from an internal combustion engine operating on a liquid hydrocarbon fuel containing a cyclopentadienyl manganese antiknock compound, said method comprising passing said exhaust gas through a conduit section containing a series of baffles, each of said baffles having at least one large opening through which exhaust gas can pass, said openings being arranged such that the openings in one baffle are not substantially in axial alignment with the openings in an adjacent baffle, the space between each baffle being empty, said baffles forming an unimpeded tortuous flow path, and then passing said exhaust gas into a catalytic reactor containing said catalyst whereby said exhaust gas passes through said catalyst, said baffles functioning to inhibit the plugging of said catalyst by manganese compounds in said exhaust gas.

14. A method of claim 13 wherein said catalyst comprises a catalytic metal supported on a honeycomb monolithic ceramic support.

15. A method of claim 14 wherein said support is selected from the group consisting of alumina-silica, alumina-magnesia-silica, and mixtures thereof.

16. A method of claim 15 wherein said catalytic metal is selected from the group consisting of platinum, palladium, and mixtures thereof.

* * * * *